(No Model.) 3 Sheets—Sheet 1.
S. S. WHEELER.
FIELD MAGNET FOR DYNAMOS.
No. 403,018. Patented May 7, 1889.
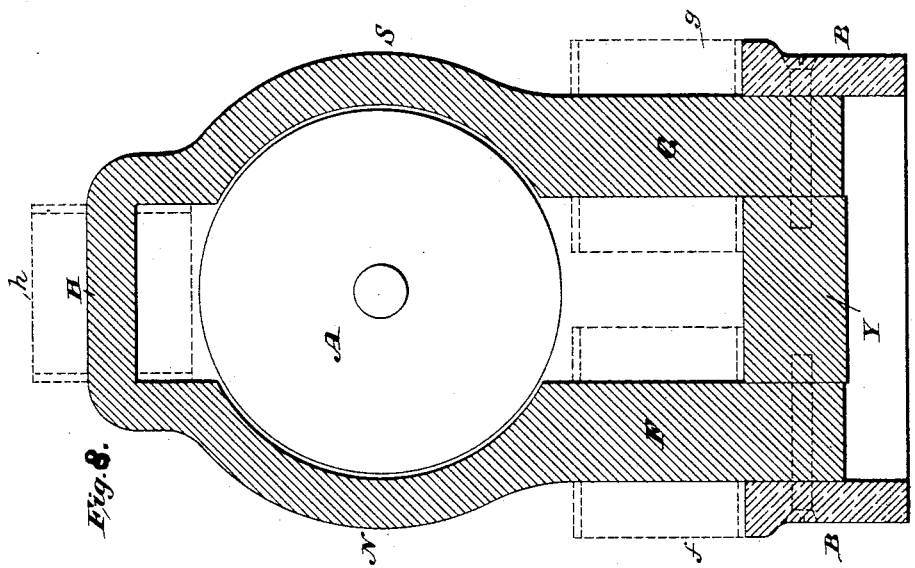
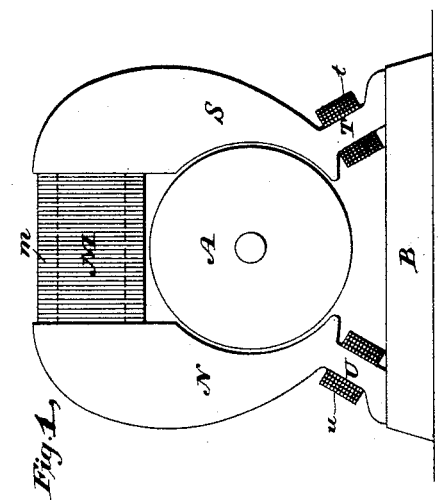

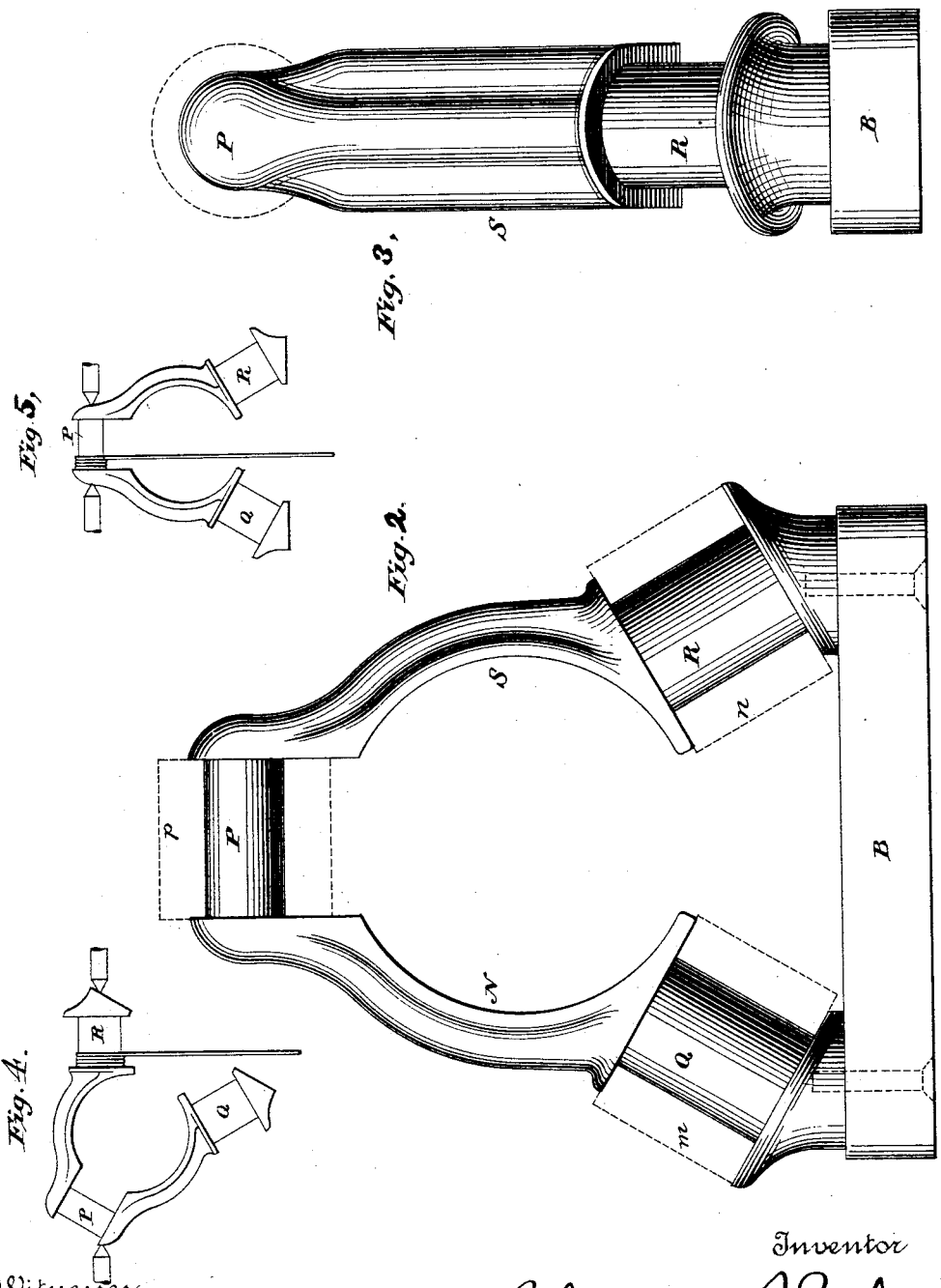
(No Model.) 3 Sheets—Sheet 2.
S. S. WHEELER.
FIELD MAGNET FOR DYNAMOS.
No. 403,018. Patented May 7, 1889.

(No Model.) 3 Sheets—Sheet 3.
S. S. WHEELER.
FIELD MAGNET FOR DYNAMOS.
No. 403,018. Patented May 7, 1889.
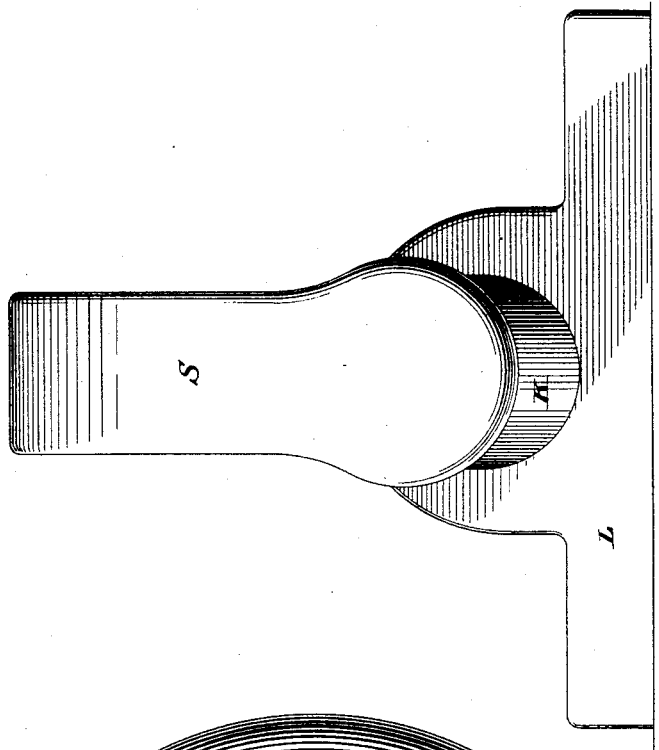
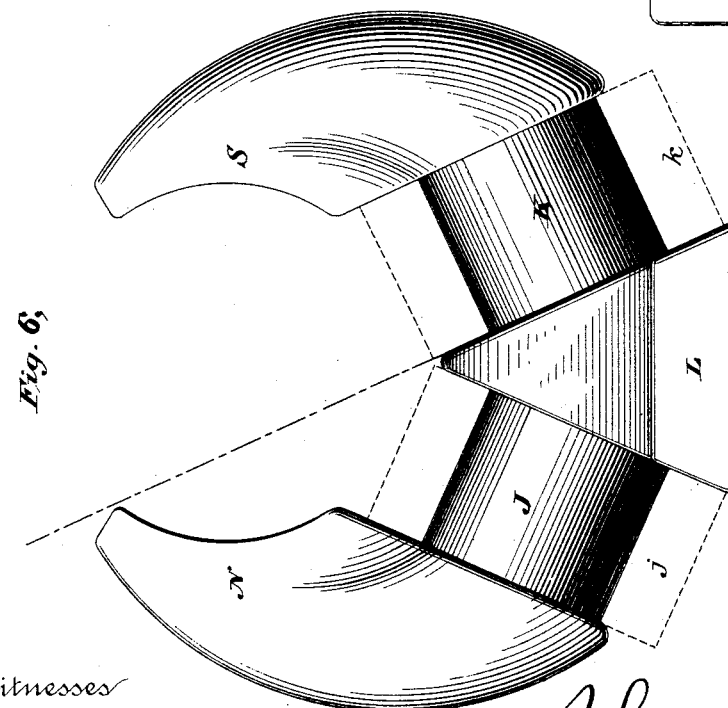
Witnesses
Geo. W. Breck.
Edward Thorpe.
Inventor
Schuyler S. Wheeler

UNITED STATES PATENT OFFICE.

SCHUYLER S. WHEELER, OF NEW YORK, N. Y.

FIELD-MAGNET FOR DYNAMOS.

SPECIFICATION forming part of Letters Patent No. 403,018, dated May 7, 1889.

Application filed July 3, 1888. Serial No. 278,914. (No model.)

*To all whom it may concern:*

Be it known that I, SCHUYLER S. WHEELER, of New York, in the county and State of New York, have invented certain new and useful Improvements in Field-Magnets for Electric Motors and Dynamos, of which the following is a specification.

In the designing and construction of field-magnets for dynamos and electric motors a number of limitations and conflicting considerations are encountered. If, for example, the magnet is made so that it can be taken apart and the cores easily wound with wire, then there are necessarily a number of joints, and these joints are decidedly objectionable, for three reasons: They are troublesome and expensive to fit properly, they weaken the construction mechanically, and they introduce breaks into the magnetic circuit. If, on the other hand, it is attempted to make a field-magnet of one piece or only a few pieces, it is usually clumsy and difficult to wind. Each turn of wire requires to be placed in position by hand, as in winding the rounded horseshoe form, for instance. In short, if the magnet is simple and strong mechanically it is hard to wind, and vice versa.

The object of my invention is, therefore, to overcome these difficulties and to make a field-magnet which is as strong as possible mechanically and capable of being easily wound, and at the same time simple and cheap to construct.

In the accompanying drawings, which illustrate my invention, Figure 1 is a side view of my improved field-magnet provided with mechanical and magnetic supports. Figs. 2 and 3 are side and end views of a field-magnet made all in one piece, but which is formed, according to my invention, so as to be capable of being easily and freely wound in its integral state. Figs. 4 and 5 are diagrams representing the above form of field-magnet being wound. Figs. 6 and 7 are side and end views of a field-magnet which can be conveniently wound on a lathe according to my invention. Fig. 8 is a vertical sectional view of a form of field-magnet similar to that shown in Figs. 2 and 3, but which is especially designed to be easily forged out of bar-iron.

Similar letters of reference indicate corresponding parts in all the figures.

Since my invention relates to field-magnets of motors and dynamos, it is not necessary to show or describe the other parts. I shall therefore assume that the armature, commutator, bearings, and other portions of the machine are of any suitable form. I have merely represented the armature A in the case of some of the figures for the sake of clearness and completeness.

Fig. 1 shows one form of my improved field-magnet, in which M represents what I denominate a "magnetic brace," and $m$ a coil wound thereon, said magnetic brace being attached integrally to or constituting a part of the upper ends of the cores N S, the electrical connections of the coil $m$ and the winding thereof being so arranged that the joint effect of said coil and the two coils $u$ and $t$ on the lower legs, U T, shall create consequent north and south poles on either side of the armature A.

The pole-pieces N and S are respectively connected to the base B by the iron braces or supports U and T, according to my invention, which may be attached to the pole-pieces or may consist of projections cast integral with the pole-pieces. These braces or feet are respectively provided with coils $u$ and $t$, which act to prevent the iron braces from forming with the iron base a magnetic short circuit, or they are even made to add a little to the field magnetism, the number of turns and the strength of current being properly proportioned, as before stated, and the polarity of the coils being arranged to oppose magnetic leakage through the feet.

In Figs. 2 and 3 I have shown a form of field-magnet made according to the same principle; but in this case the whole field is designed according to my invention, instead of being simply a brace applied to one of the ordinary forms. This field-magnet consists of pole-pieces N and S and main field-magnet cores Q and R. The pole-pieces N and S are connected across the top by a magnetic brace, P, according to my invention, which corresponds to the brace E in Fig. 1. This brace P is made of sufficient strength for the purpose, and may be bolted or otherwise attached to the pole-pieces. I prefer, however, to cast the whole field-magnet, as represented in Fig. 3, in one piece and make the cores Q and R at such an angle with respect to each other that either may be wound freely without interference from the other, as represented in Fig. 4. The magnetic brace or supplementary core P can also be wound freely, as represented in Fig. 5. Thus all three cores can be easily wound, and a form of field-magnet is obtained which is very strong and rigid mechanically and in which the magnetic circuits are short. The yoke joining the cores Q and R, which is required to complete the magnetic circuit through them, may be a separate piece bolted onto them in the usual manner; but I prefer to cast it as part of the base. In fact, the base may be simply thickened at that point, so that when the field-casting is bolted to the base-casting the magnetic frame-work is completed. In either case the magnet is attached to the base at the neutral portion of the former, which is always desirable. A field-magnet made all in one piece is a decided advantage in a great many respects. It can be bored out and fitted to the base as one solid piece, and after it is once made properly it is always exactly the same, whereas a magnet made of several pieces has to be carefully fitted together again and adjusted each time after the machine is taken apart in manufacture or for transportation or repairs. It is obvious that the proportions of the cores of this field-magnet may be varied, if desired. The relative diameters, for example, of the cores P and Q may be made different from that represented in the drawings, and the upper core or brace, P, need only be made sufficiently large to give the requisite strength, the lower cores, Q and R, being made large enough to produce the greater part of the field magnetism. In this way the large and heavier portions of the field-magnet are brought down low and the machine is not top-heavy, as it would be apt to be if the core P were made large.

The relative amount of wire with which the cores P, Q, and R in Fig. 2 should be wound depends upon their relative sizes. It will be seen that there are two magnetic circuits in multiple arc, one being formed by the upper coil, P, with the pole-pieces N and S and the armature, and the other being formed by the two large coils Q and R, the yoke or base B, and the armature. These two circuits being preferably of different cross-sections, as I have explained, it is necessary to proportion the windings on them so as to obtain a magnetic balance between them and have each magnet work on the proper point on its saturation curve to get the most economical effects. This balance can be calculated by well-known formulas, or found by trial, one circuit being varied while the other is kept constant, and vice versa.

In Figs. 6 and 7 I have shown another form of my field-magnet, in which the cores J and K are placed at such an angle with respect to each other that each can be freely wound, as shown in Fig. 6. This form of field-magnet is attached to the base by the yoke or neutral portion L. I prefer to cast this form of field-magnet in one piece, in which case it makes an extremely strong and simple form of magnet.

If the brace P in Fig. 2 be made quite small in cross-section, so that the amount of magnetism which would be short-circuited by or leak through it would be small enough to be insignificant or allowable, then the brace need not be wound with wire; or, in other words, the field-magnet may be cast in one piece in order to secure the great advantages which result therefrom, by making the main magnets a little larger in order to make up for the leakage through the brace.

In Fig. 8 the form of field-magnet represented is similar to that shown in Figs. 2 and 3; but it is specially designed to be easily made of wrought-iron by simply taking a piece of bar-iron and forging it around a form. In this case the lower cores, F and G, are made parallel to each other, instead of at an angle; but they may just as well be placed at an angle to each other, like the cores Q and R in Fig. 2. If these cores F and G are made parallel to one another, the coils $f$ and $g$ may be wound off of the cores on a mandrel, for example, and afterward slipped onto them. In Fig. 8 the yoke Y is represented placed between the extremities of the cores F and G, the whole being held together by the base B around the outside, as represented. This makes a very strong construction; but it is evident that the cores F and G may be screwed to the base or yoke from below, as represented in Fig. 3.

The expression "freely wound" will of course be understood to mean, both in the specification and the claims, that the wire may be wound upon the core directly and freely (in a lathe, for example) without interference from any other part or parts of the magnet, as clearly shown in Figs. 4 and 5.

I am aware that it is not novel with me to provide the field-magnets of a dynamo-machine with a magnetic bridge or brace which carries an additional field-magnet coil, but of differential winding. Nor is it new to provide a dynamo-machine with two such bridges or braces located on either side of the armature and having additional field-coils energized by a derived circuit the electrical capacity of which is regulated by an extraneous device controlled by the working circuit. Such devices are old in the art for regulating the capacity of this type of machines, and the function of the magnetic braces as there used is entirely different from the same as used in my improved machine, and I do not therefore claim a magnetic brace or bridge, broadly.

I am also aware that it is old in the art to cast bipolar field-magnets and a base or support therefor of one piece of metal.

Having now described my invention, what I claim, and desire to secure by Letters Patent, is—

1. A field-magnet for electric motors or dynamos, made in the general form of a triangle, with a core at the vertex capable of being freely wound through the armature-space and cores near the base at the two sides and placed at an angle to each other, so as to be freely wound without interference, substantially as shown and described.

2. A field-magnet for dynamo-electric machines or electric motors made in the general form of the letter A, with a core at the top joining the pole-pieces and forming one magnetic circuit, and a core at each side below, which, with the base or yoke, forms another magnetic circuit, substantially as described.

3. In a field-magnet for a dynamo-electric machine or motor, a core-piece of horseshoe type made of a single piece of magnetic material, with three field-coils, two of which are located near the ends of the core-piece, while the third is located at an intermediate point, the winding of said coils being such that effective field-poles of opposite polarity are created at points between the opposite ends of the intermediate coil and the adjacent ends of the other two coils, substantially as described.

4. In a field-magnet for a dynamo-electric machine or motor, a core of a single piece of magnetic material and three field-coils located, respectively, near the opposite ends and center of said core, the contour or shape of the core being such that a plane passing substantially at a right angle through any one of said coils will intersect the core once and only once, substantially as described.

5. In a field-magnet for a dynamo-electric machine or motor, a core of a single piece of magnetic material of curvilinear or angular shape, and two field-coils, one at or near each end of the core, the angular relation of said coils being such that a plane passing through either of them at substantially a right angle to the core and parallel to the winding of said coil will cut the core once and only once, substantially as described.

6. A dynamo-electric machine having a field-core of a single piece of magnetic material and three or more field-coils, in combination with a magnetic base or support to which the ends of the field-core are secured, substantially as described.

7. In a dynamo-electric machine or motor, a field-core of a single piece of magnetic material, in combination with three or more field-coils and a magnetic base or support, both ends of said field-core being fixed or secured rigidly to said base, the coils being so disposed that they create a consequent field and prevent a magnetic short circuit through the support or base, substantially as described.

8. In a field-magnet for a dynamo-electric machine or motor, a core of a single piece of magnetic material, that portion between the two effective poles of said core constituting a magnetic brace, in combination with a magnetic base or support, substantially as described.

9. In a field-magnet for a dynamo-electric machine or motor of bipolar form, a core-piece made of a single piece of magnetic material with two or more field-coils, the contour or shape of the core being such that a plane which passes at substantially a right angle through either one of said coils and the core will cut said core once and only once, substantially as described.

10. In a field-magnet for a dynamo-electric machine or motor, a core of a single piece of magnetic material of curvilinear or angular shape, and two field-coils located on said core, the angular relation of said coils being such that any plane passing through either of them at substantially a right angle to the core will cut said core once and only once, substantially as described.

SCHUYLER S. WHEELER.

Witnesses:
CHARLES M. JOHANSON,
A. DENISON WILLIAMS, Jr.